US012251051B2

(12) United States Patent
Deng et al.

(10) Patent No.: US 12,251,051 B2
(45) Date of Patent: Mar. 18, 2025

(54) BLENDER SYSTEM WITH VIBRATION PROOF SEAL

(71) Applicant: SHARKNINJA OPERATING LLC, Needham, MA (US)

(72) Inventors: Yaoming Deng, Guangdong (CN); Kevin Pei, Guangdong (CN); Kai Zhou, Guangdong (CN); Gang Chen, Guangdong (CN); Edward Lockyer, Pimlico (GB); Sam Bannister, Kent (GB); Matthew P. Roberts, Needham, MA (US); Nicholas Michael O'Loughlin, Hong Kong (CN)

(73) Assignee: SharkNinja Operating LLC, Needham, MA (US)

( * ) Notice: Subject to any disclaimer, the term of this patent is extended or adjusted under 35 U.S.C. 154(b) by 968 days.

(21) Appl. No.: 17/267,275

(22) PCT Filed: Aug. 10, 2018

(86) PCT No.: PCT/CN2018/099931
§ 371 (c)(1),
(2) Date: Feb. 9, 2021

(87) PCT Pub. No.: WO2020/029242
PCT Pub. Date: Feb. 13, 2020

(65) Prior Publication Data
US 2021/0321824 A1    Oct. 21, 2021

(51) Int. Cl.
*A47J 43/07*      (2006.01)
*A47J 43/046*     (2006.01)
*A47J 43/08*      (2006.01)

(52) U.S. Cl.
CPC ......... *A47J 43/0727* (2013.01); *A47J 43/046* (2013.01); *A47J 43/085* (2013.01)

(58) Field of Classification Search
CPC ..... A47J 43/0727; A47J 43/046; A47J 43/085
See application file for complete search history.

(56) References Cited

U.S. PATENT DOCUMENTS 5,277,577 A  *  1/1994  Schachter ............... F23Q 2/163
                                                    222/3
10,638,867 B2    5/2020  Zhang et al.
(Continued)

FOREIGN PATENT DOCUMENTS

| CN | 103857317 A | 6/2014 |
| CN | 105919396 A | 9/2016 |

(Continued)

OTHER PUBLICATIONS

English translation of CN-207355989-U, Liu et al., obtained Nov. 28, 2023 from <https://worldwide.espacenet.com/>. (Year: 2023).*

(Continued)

*Primary Examiner* — Marc C Howell
*Assistant Examiner* — Patrick M McCarty
(74) *Attorney, Agent, or Firm* — The Webb Law Firm

(57) ABSTRACT

A container (32) includes a sealable body including a chamber (42), at least one opening formed in the sealable body, and a vacuum sealing assembly (52) mounted to the sealable body adjacent at least one opening. The vacuum sealing assembly (52) includes a valve (60) and a mechanism (70) moveable between a first position that maintains the valve (60) in a sealing engagement with at least one opening and a second position that removes the valve (60) from the sealing engagement or exposes the valve (60) for removal from the sealing engagement.

19 Claims, 19 Drawing Sheets

(56) References Cited

U.S. PATENT DOCUMENTS

| | | | |
|---|---|---|---|
| 2003/0047700 A1* | 3/2003 | Motonaka | F16K 15/18 251/149.1 |
| 2014/0186507 A1 | 7/2014 | Wales | |
| 2015/0238030 A1* | 8/2015 | Brown | A47G 19/2266 220/715 |
| 2016/0003365 A1* | 1/2016 | Park | B65D 81/2038 137/511 |
| 2017/0086622 A1 | 3/2017 | Chung | |
| 2018/0098666 A1* | 4/2018 | Lee | B65D 81/2038 |
| 2018/0220829 A1 | 8/2018 | Zhang et al. | |
| 2018/0360271 A1 | 12/2018 | Katsuki et al. | |

FOREIGN PATENT DOCUMENTS

| | | | | |
|---|---|---|---|---|
| CN | 207323368 U | | 5/2018 | |
| CN | 207355989 U | | 5/2018 | |
| CN | 207370620 U | | 5/2018 | |
| CN | 108245001 A | * | 7/2018 | A47J 27/002 |
| CN | 207627176 U | | 7/2018 | |
| CN | 207666476 U | | 7/2018 | |
| EP | 2960175 A1 | | 12/2015 | |
| GB | 2515988 A | * | 1/2015 | A45C 11/20 |
| JP | 2017196561 A | | 11/2017 | |
| KR | 101344759 B1 | | 12/2013 | |
| KR | 101821786 B1 | * | 1/2018 | |
| TW | M319237 U | | 9/2007 | |
| WO | WO-2004033331 A1 | * | 4/2004 | B65D 77/225 |
| WO | WO-2016159796 A1 | * | 10/2016 | |
| WO | 2018010341 A1 | | 1/2018 | |
| WO | WO-2018107451 A1 | * | 6/2018 | |

OTHER PUBLICATIONS

English translation of CN207627176U, Liu et al., Jul. 20, 2018, translation obtained Jun. 12, 2024 from <https://worldwide.espacenet.com/> (Year: 2024).*

International Preliminary Report on Patentability dated Feb. 16, 2021, International Application No. PCT/CN18/99931 filed Aug. 10, 2018 (5 pages).

Second Office Action in Chinese Application No. 201880096502.5 dated Sep. 6, 2023 (with English translation), 10 pages.

International Search Report and Written Opinion of the International Searching Authority; International Application No. PCT/CN2018/099931; International Filing Date: Aug. 10, 2018; Date of Mailing: May 13, 2019; 10 pages.

Search Report accompanying Notification to Go Through Formalities of Registration in Chinese Application No. 201880096502.5 dated Jan. 6, 2024 [with English translation], 5 pages.

* cited by examiner

BLENDER SYSTEM WITH VIBRATION PROOF SEAL

CROSS REFERENCE TO RELATED APPLICATIONS

This application is a National Stage Application of PCT/CN2018/099931, filed Aug. 10, 2018, which is incorporated by reference in its entirety herein.

BACKGROUND

Exemplary embodiments of the present invention relate to a blender, and more particularly to a container of a blender configured to receive one or more food items therein.

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Several benefits can be achieved by forming a vacuum within a blender container or attachment either prior to or after a blending operation. For example, by forming a vacuum prior to a blending operation, the overall degradation of the nutritional properties of the ingredients being processed may be reduced. Accordingly, a blender container or attachment may include a seal that is movable to selectively form a vacuum within the blender container. However, when the blender container is used in high vibration environments, such as in a vehicle or when the container is being carried in a bag for example, it is possible that liquid or other ingredients from the interior of the blender container may leak through the seal.

SUMMARY

According to an embodiment, a container assembly includes a sealable body including a chamber, at least one opening formed in said sealable body, and a vacuum sealing assembly mounted to said sealable body adjacent said at least one opening. The vacuum sealing assembly includes a valve and a mechanism moveable between a first position that maintains said valve in a sealing engagement with said at least one opening and a second position that removes said valve from said sealing engagement or exposes said valve for removal from said sealing engagement.

In addition to one or more of the features described above, or as an alternative, in further embodiments said valve includes a valve stem and a flange in overlapping arrangement with said at least one opening.

In addition to one or more of the features described above, or as an alternative, in further embodiments in said first position, said mechanism applies a force to a peripheral portion of said flange.

In addition to one or more of the features described above, or as an alternative, in further embodiments a portion of said mechanism engages said flange, said portion of said mechanism having a contour complementary to a contour of said flange.

In addition to one or more of the features described above, or as an alternative, in further embodiments said mechanism is rotatable about an axis between said first position and said second position, said axis being oriented generally perpendicular to the at least one opening.

In addition to one or more of the features described above, or as an alternative, in further embodiments said mechanism is rotatable about an axis between said first position and said second position, said axis being oriented generally parallel to the at least one opening.

In addition to one or more of the features described above, or as an alternative, in further embodiments said mechanism is configured to translate perpendicularly to a surface of said valve as said mechanism rotates about said axis.

In addition to one or more of the features described above, or as an alternative, in further embodiments comprising a biasing mechanism coupled to said mechanism, wherein said mechanism is biased into said first position by a biasing force of said biasing mechanism.

In addition to one or more of the features described above, or as an alternative, in further embodiments said biasing mechanism is a coil spring mounted between said sealable body and said mechanism.

In addition to one or more of the features described above, or as an alternative, in further embodiments said biasing mechanism is a torsion spring mounted between said sealable body and said mechanism.

In addition to one or more of the features described above, or as an alternative, in further embodiments said valve further comprises at least one protrusion extending from said flange.

In addition to one or more of the features described above, or as an alternative, in further embodiments said mechanism is coupled to said at least one protrusion.

In addition to one or more of the features described above, or as an alternative, in further embodiments said sealable body further comprises a container defining a chamber and a rotatable blade assembly coupled to an open end of the container.

In addition to one or more of the features described above, or as an alternative, in further embodiments the sealable body further comprises a container defining a chamber, at least one rotatable blade disposed within said chamber, and a lid coupled to an open end of the container.

According to another embodiment, a food processing system includes a food processor base including a rotary component, and an attachment configured for removable association with said food processor base. The attachment includes a sealable body including at least one opening, a rotary coupling connected to at least one blade positioned within said chamber of said sealable body, said rotary coupling being associable with said rotary component of said food processor base, and a vacuum sealing assembly mounted to said sealable body adjacent said at least one opening. The vacuum sealing assembly includes a valve and a mechanism movable to maintain said valve in sealing engagement with said at least one opening or to remove said valve from said sealing engagement or expose said valve for removal from said sealing engagement.

In addition to one or more of the features described above, or as an alternative, in further embodiments rotation of said at least one blade is driven by said rotary component.

In addition to one or more of the features described above, or as an alternative, in further embodiments said rotary component is configured to engage and drive said rotary coupling of said rotatable blade assembly.

In addition to one or more of the features described above, or as an alternative, in further embodiments said valve includes a valve stem and a flange, said flange being positioned in overlapping arrangement with said at least one opening.

In addition to one or more of the features described above, or as an alternative, in further embodiments said mechanism selectively applies a force to a peripheral portion of said flange to maintain said valve in sealing engagement with said at least one opening.

In addition to one or more of the features described above, or as an alternative, in further embodiments said mechanism further comprises an engagement member rotatable about an axis relative to said valve and a biasing mechanism coupled to said engagement member, wherein said engagement member is biased into contact with said valve by a biasing force of said biasing mechanism.

In addition to one or more of the features described above, or as an alternative, in further embodiments said sealable body further comprises a container including an open end and a rotatable blade assembly including said rotary coupling connected to at least one blade, said rotatable blade assembly being mounted to said open end of said container.

In addition to one or more of the features described above, or as an alternative, in further embodiments said vacuum sealing assembly is formed in said container.

In addition to one or more of the features described above, or as an alternative, in further embodiments said vacuum sealing assembly is formed in said rotatable blade assembly.

According to yet another embodiment, a method of blending one or more food items includes arranging the one or more food items within a chamber of a food processing attachment and moving an engagement mechanism of a vacuum sealing assembly of said food processing attachment from a first position to a second position. In said first position, a valve of said vacuum sealing assembly is maintained in sealing engagement with an opening in said food processing attachment and in said second position, said valve is removed from said sealing engagement or said valve is exposed for removal from said sealing engagement. The method further including generating a vacuum within said chamber and performing a food processing operation.

In addition to one or more of the features described above, or as an alternative, in further embodiments comprising applying a vacuum device to said vacuum sealing assembly.

In addition to one or more of the features described above, or as an alternative, in further embodiments applying said vacuum device to said vacuum sealing assembly moves said engagement mechanism from said first position to said second position.

In addition to one or more of the features described above, or as an alternative, in further embodiments applying said vacuum device to said vacuum sealing assembly opposes a biasing force of a biasing mechanism coupled to said engagement mechanism.

In addition to one or more of the features described above, or as an alternative, in further embodiments comprising removing said vacuum device.

In addition to one or more of the features described above, or as an alternative, in further embodiments moving said engagement mechanism from said first position to said second position includes rotating said engagement mechanism about an axis in a first direction.

In addition to one or more of the features described above, or as an alternative, in further embodiments comprising releasing said vacuum within said chamber after performing said food processing operation.

In addition to one or more of the features described above, or as an alternative, in further embodiments releasing said vacuum within said chamber further comprises rotating said engagement mechanism further about said axis in said first direction.

In addition to one or more of the features described above, or as an alternative, in further embodiments rotating said engagement mechanism further about said axis in said first direction is performed manually.

According to yet another embodiment, a container includes a sealable body defining a chamber, at least one first opening formed through a wall of said sealable body, said at least one opening being in fluid communication with said chamber, a vacuum sealing assembly mounted to said sealable body adjacent said at least one opening, and at least one protrusion surrounding said at least one opening and extending into said chamber, wherein a distal end of said protrusion is offset from an adjacent surface of said wall.

In addition to one or more of the features described above, or as an alternative, in further embodiments a surface area of said distal end of said protrusion is minimized.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
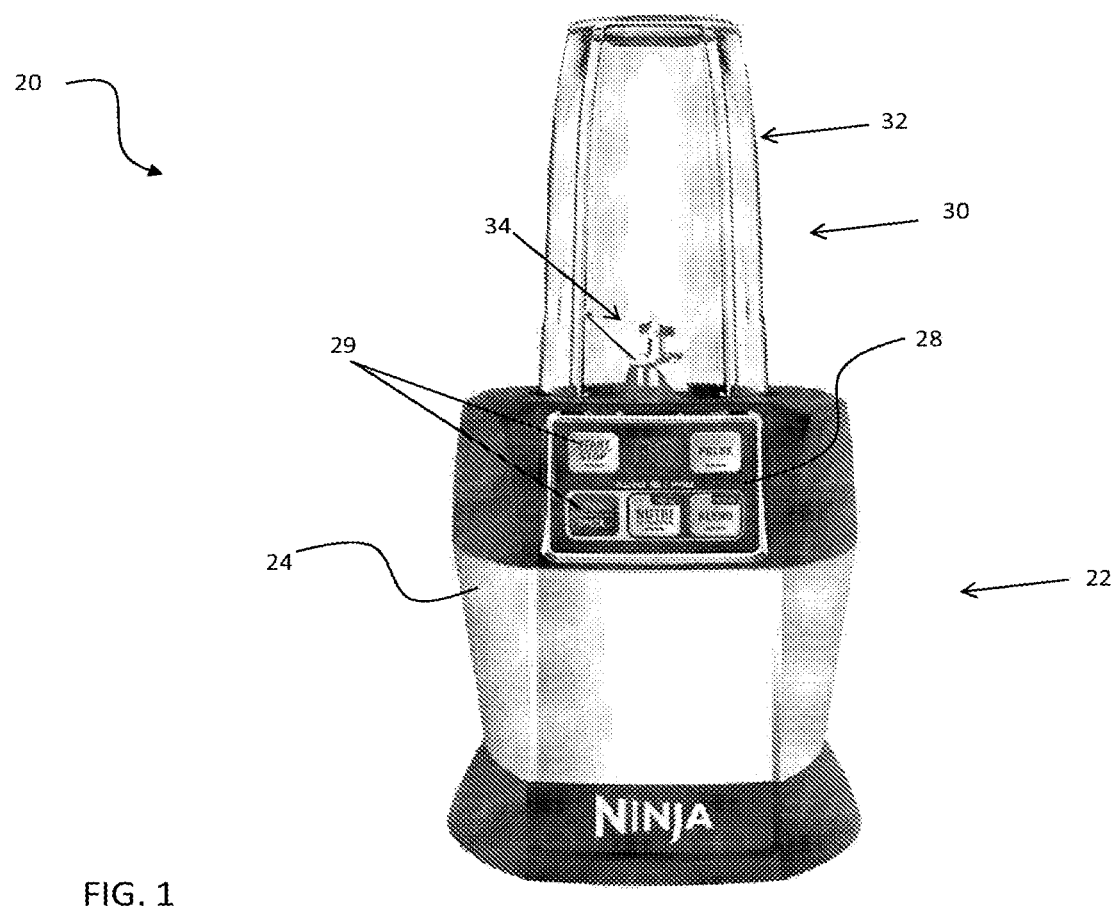
FIG. 1 is a perspective view of an example of a food processing system.
Figure 2:
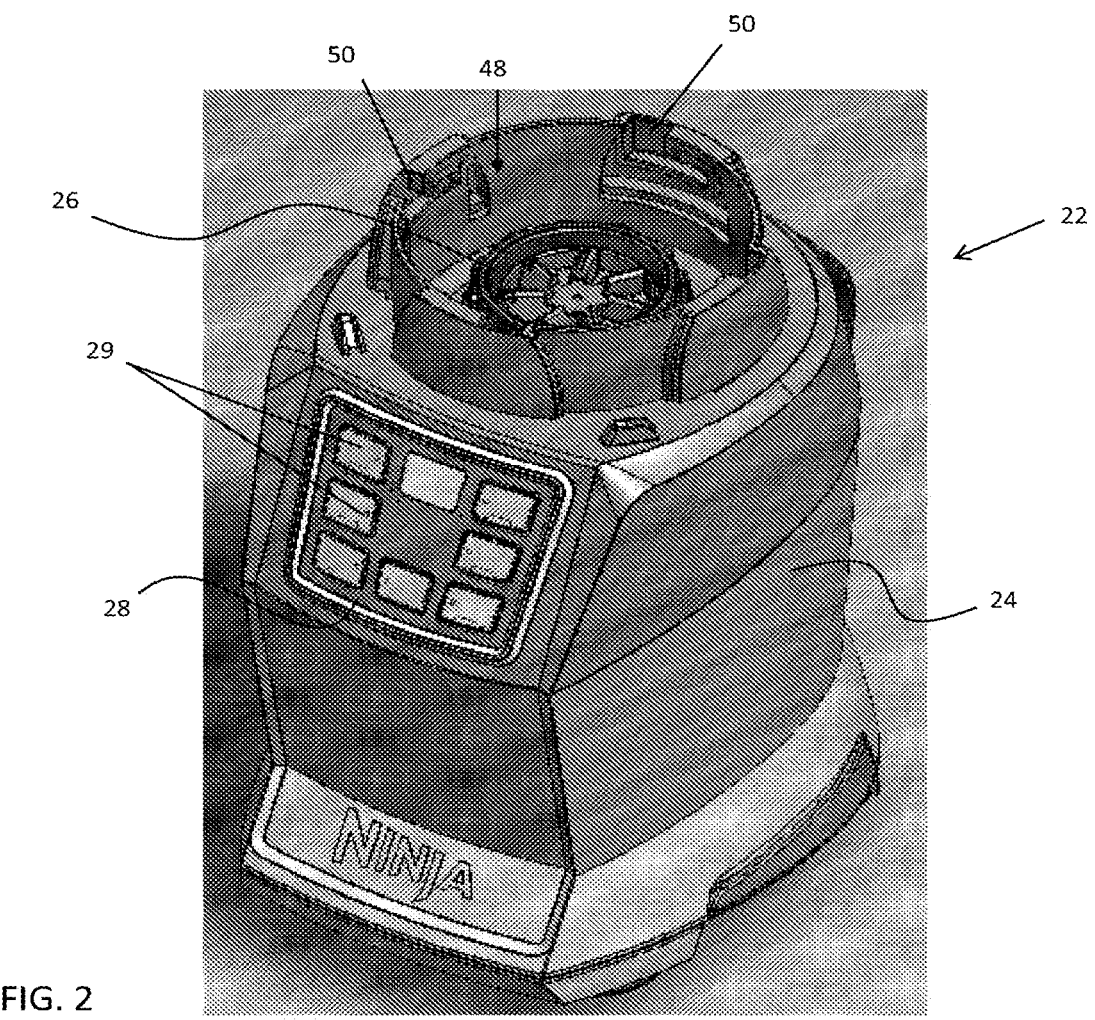
FIG. 2 is a perspective view of a base of a food processing system.

Referring now to FIGS. 1 and 2, an example of a multi-functional food processing system 20 is illustrated in more detail. In general, the food processing system 20 can be adapted to perform any food processing or blending operation including as non-limiting examples, dicing, chopping, cutting, slicing, mixing, blending, stirring, crushing, or the like. Although the food processing system illustrated and described herein is a personal blender system, other food processing systems are within the scope of the present disclosure.

The food processing 20 system includes a base 22 having a body or housing 24 within which a motorized unit (not shown) and at least one controller (not shown) are located. The base 22 includes at least one rotary component, such as a drive coupler 26 (see FIG. 2) for example, driven by the motorized unit located within the body 24. The base 22 additionally includes a control panel or user interface 28 having one or more inputs 29 for turning the motorized unit on and off and for selecting various modes of operation, such as pulsing, blending, or continuous food processing. The at least one drive coupler 26 is configured to engage a portion of an attachment 30 coupled to the base 22 for the processing of food products located within an interior of the attachment 30. This will become more apparent in subsequent FIGS. and discussion.

Figure 3:
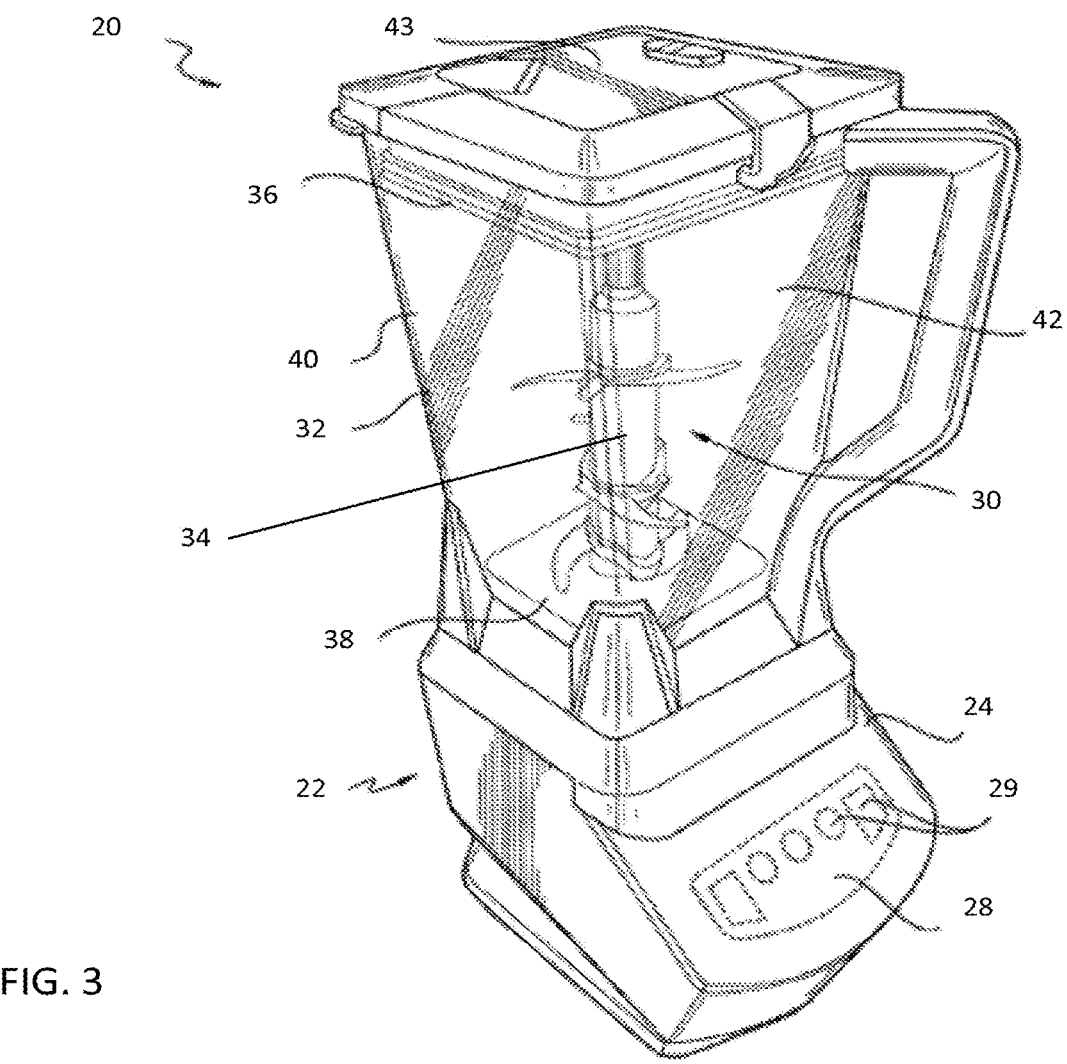
FIG. 3 is a perspective view of a food processing system having a first attachment.

One or more attachments 30 varying in size and/or functionality may be configured for use with the base 22. In an embodiment, the attachment 30 includes a jar or container 32 having a rotatable blade assembly 34. In some embodiments, the container 32 may be sized to hold approximately 72 fluid ounces. However, embodiments where the container 32 has a larger or smaller capacity are also within the scope of the disclosure. As shown, the container 32 typically includes a first open end 36, a second closed end 40, and one or more sidewalls 40 extending between the first end 36 and the second end 40 to define a hollow interior chamber 42 of the container 32. The rotatable blade assembly 34 may be integrally formed with the second end 40 of the container 32, or alternatively, may be removably coupled thereto. The attachment 30 may additionally include a lid 43 configured to couple to the first open end 36 of the container 32 to seal the container. The second sealed end 40 of the attachment of FIG. 3 is configured to mount to the base 22 to perform a food processing operation. Accordingly, the orientation of the container when the attachment is connected to the base 22 and separated from the base 22 remains generally constant.

Figure 4:
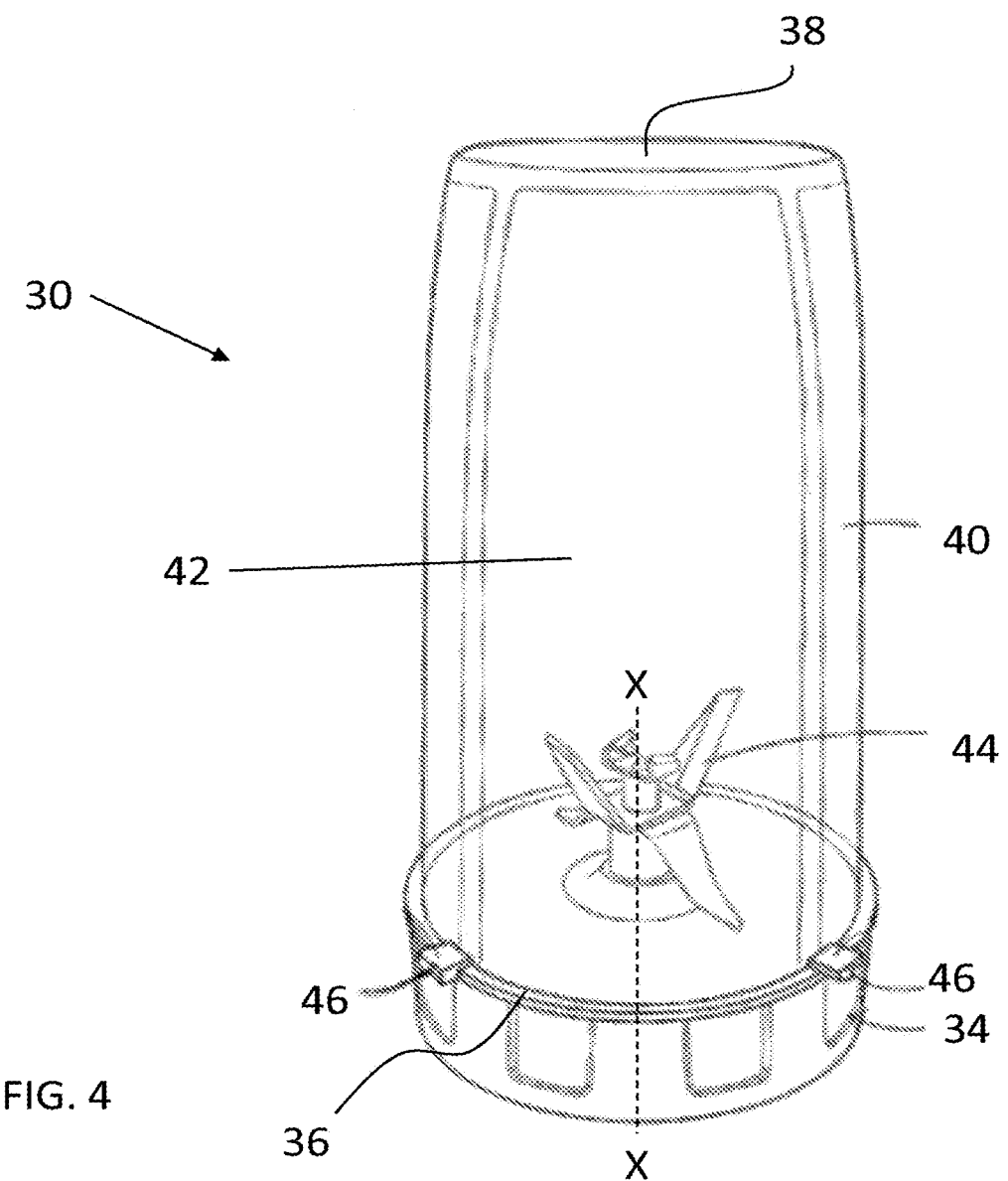
FIG. 4 is a perspective view of an attachment suitable for use with a food processing system.

Another example of an attachment suitable for use with the food processing system is shown in FIG. 4. In the illustrated, non-limiting embodiment, the attachment 30 is an inverted jar or container 32 having a rotatable blade assembly 34 coupled thereto. Similar to the attachment of FIG. 3, the container 32 typically includes a first open end 36, a second closed end 38, and one or more sidewalls 40 extending between the first end 36 and the second end 40 to define a hollow interior chamber 42 of the container 32. However, when the attachment 30 is a personal blending container that has a first configuration when separated from the base 22 and a second inverted configuration when coupled to the base 22, the rotatable blade assembly 34 is configured to couple to the first open end 36 of the container 32 to seal the chamber 42. The container 32 and blade assembly 34 may be threadably coupled together; however, it should be understood that other mechanisms for removably connecting the container 32 and the blade assembly 34 are also contemplated herein.

In each of the various attachment configurations, the rotatable blade assembly 34 is configured to couple to the base 22 of the food processing system 20. A driven coupler (not shown) associated with the at least one blade 44 is positioned outside the rotatable drive assembly 34. The at least one drive coupler 26 is configured to engage the driven coupler to rotate the at least one blade 44 about an axis X to process the food products located within the chamber 42 of the attachment 30. It should be understood that the attachment 30 including an inverted container 32 and a rotatable blade assembly 34 is intended as an example only, and that other attachments, are also contemplated herein.

In embodiments where the attachment 30 includes an inverted container 32, the attachment 30 may include one or more contact members 46, such as tabs for example, positioned about the periphery of the attachment 30. Although four contact members 46 are generally illustrated in the FIGS., any number of contact members 46 is within the scope of the disclosure. In embodiments where the attachment 30 includes an inverted container 32 and a blade assembly 34, the contact members 46 may extend outwardly from the container 32, the blade assembly 34, or both.

The contact members 46 of the attachment 30 are configured to cooperate with a mounting area 48 of the base 22 to couple the attachment 30 to the base 22. As shown, the mounting area 48 includes one or more receiving slots 50 within which each of the plurality of contact members 46 of the attachment 30 is receivable. The attachment 30 may be configured to slidably connect to the base 22 of the food processing system 20. Alternatively or in addition, the attachment 30 may be configured to rotatably connect to the base 22 such that the attachment 30 is locked relative to the base 22. However, it should be understood that any suitable mechanism for coupling the attachment to the base 22 is within the scope of the disclosure.

With reference now to FIGS. 4-14, the attachment 30 may include a vacuum sealing assembly 52. In the illustrated, non-limiting embodiments, the vacuum sealing assembly 52 is positioned at or adjacent the closed second end 38 of the container 32. More specifically, the vacuum sealing assembly 52 may be formed in an interior wall 54 of the container 32 that seals the chamber 42 but is offset from the second end 38 of the container 32. By arranging the vacuum sealing assembly 52 at this position, the vacuum sealing assembly 52 is easily accessible by a user when an attachment 30, and in particular an attachment 30 including an inverted container 32, is coupled to the base 22 of the food processing system 20. However, in other embodiments, the vacuum sealing assembly 52 may be located at another location about the attachment 30. For example, depending on the configuration of the attachment 30, the vacuum sealing assembly 52 may be formed in the rotatable blade assembly 34 or in the lid 43.

Various embodiments of a vacuum sealing assembly 52 are illustrated. Although the vacuum sealing assembly 52 is generally illustrated as being centered along an axis defined by the attachment 30, it should be understood that embodiments where the vacuum sealing assembly 52 is offset from the central axis, such as adjacent an outer periphery of the attachment 30 for example, are also within the scope of the disclosure. In each of the embodiments, a primary opening 56 and at least one secondary opening 58 (best shown in FIG. 6) are formed in the end wall 54 of the container 32.

The vacuum sealing assembly 52 includes an umbrella valve 60 having a valve stem 62 extending through the primary opening 56 and a flange 64 extending generally perpendicular to the valve stem 62. As shown, the dimensions of the distal end 66 of the valve stem 62 are greater than the primary opening 56 to restrict movement of the umbrella valve 60 relative to the container 32. Via the engagement between the valve stem 62 and the primary opening 56, a flow of fluid or food particles from the interior chamber 42 of the container 32 through the primary opening 56 is restricted. The flange 64 is sized such that a portion of the flange 64, such as near the periphery of the flange 64 for example, is in overlapping arrangement with the at least one secondary opening 58. Accordingly, under normal conditions, the flange 64 seals the at least one secondary opening 58 to prevent a flow of fluid and/or food particles there through. The umbrella valve 60 additionally includes at least one protrusion 68 extending generally upwardly from the flange 64, in a direction generally opposite the valve stem 62. In an embodiment, this protrusion 68 is arranged generally adjacent a periphery of the flange 64 of the umbrella valve 60.

In each of the illustrated embodiments, the vacuum sealing assembly 52 includes a mechanism 70 configured to restrict movement of the peripheral portion of the flange 64 of the umbrella valve 60. For example, with reference to the embodiment of FIGS. 5 and 6, the mechanism 70 includes a cap 72 movable, such as rotatable about a hinge for example, between a closed position (FIG. 5) and an open position (FIG. 6) to access the umbrella valve 60. Alternatively, the cap 72 may be completely separated from the container 32 when in the open position. In the illustrated, non-limiting embodiment, the cap 72 is retained within the closed position via a snap-fit connection, such as by receipt of a protrusion 74 extending from the cap 72 within a complementary opening 76 formed in the container 32. However, any suitable mechanism for selectively retaining the cap 72 in the closed position and for selectively releasing the cap 72 from the closed position is within the scope of the disclosure.

The cap 72 may be formed from any suitable material, such as a food safe, hard plastic for example, and is receivable within the contour of the container 32. As a result, when the container 32 is supported by its second end 38, such as prior to or after use with the food processing system 20, the container 32 is not supported by the cap 72.

As shown, a first portion 78 of the cap 72 is configured to contact the umbrella valve 60 when the cap 72 is in the closed position. The first portion 78 may have a contour generally complementary to the corresponding surface of the umbrella valve 60 such that the first portion 78 applies a force to the umbrella valve 60, and specifically to the peripheral portion of the flange 64 that seals the at least one secondary opening 58. In an embodiment, an elastomeric or rubber component 80 may be connected to or integrally formed with the first portion 78 and configured to engage the peripheral portion of the flange 64.

Figure 5:
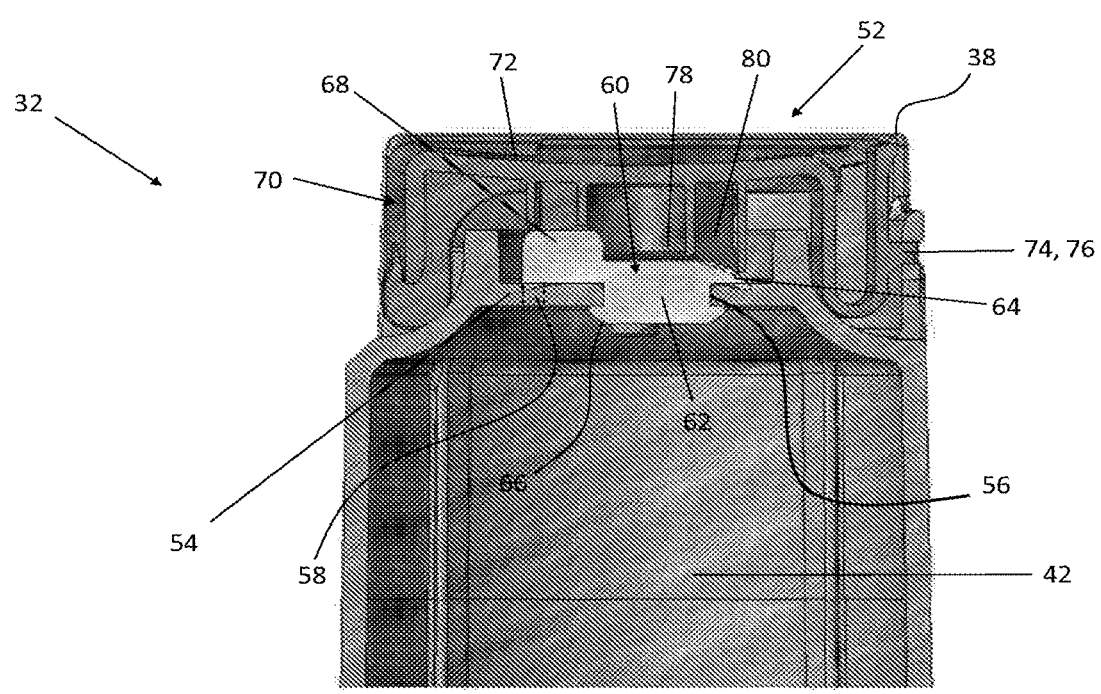
FIG. 5 is a cross-sectional view of a vacuum sealing assembly in a first configuration according to an embodiment.
Figure 6:
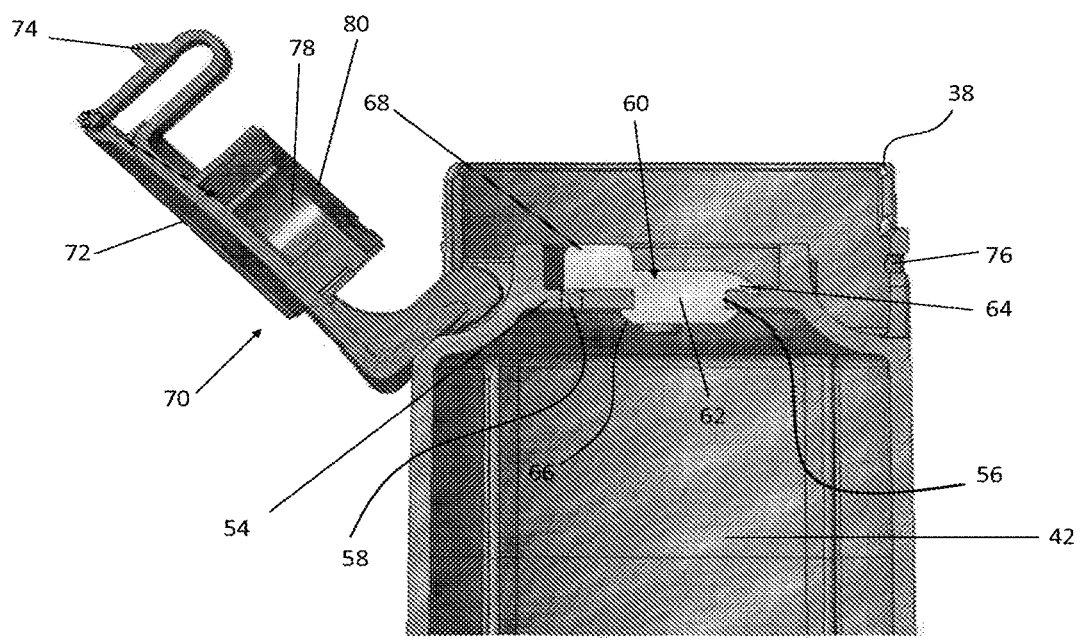
FIG. 6 is a cross-sectional view of the vacuum sealing assembly of FIG. 5 in a second configuration according to an embodiment.
Figure 7:
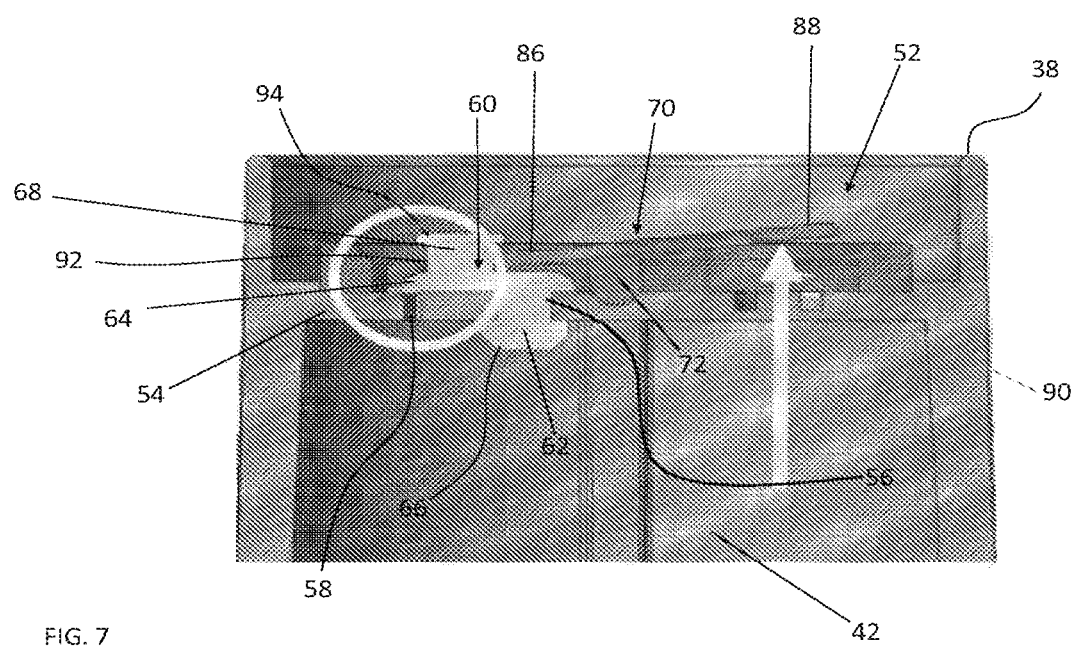
FIG. 7 is a cross-sectional view of another vacuum sealing assembly in a first configuration according to an embodiment.

The vacuum sealing assembly 52 of FIGS. 5 and 6 is transformable between a plurality of configurations and corresponding operational modes. In a first, normal or default mode of operation, as shown in FIG. 5, the vacuum sealing assembly 52 is in a first configuration. In the first configuration, the cap 72 is closed and cooperates with the umbrella valve 60 to seal the primary and secondary openings 56, 58 of the container 32. Food is typically added to the chamber 42 of the container 32 when the vacuum sealing assembly 52 is in the first mode. Further, in the first mode and configuration, the rotatable blade assembly 34 may be affixed to the container 32, and the attachment 30 may be coupled to the food processing base 22.

In a second mode of operation, the vacuum sealing assembly 52 is arranged in a second configuration as a result of a vacuum pump or other suitable device 82 (see FIG. 8) being positioned in overlapping arrangement with and operably coupled to the umbrella valve 60. It should be understood that when the vacuum pump is operably coupled to the umbrella valve 60, the vacuum pump 82 may be arranged in direct contact with, or alternatively, may be offset from the umbrella valve. Accordingly, in the second configuration, the cap 72 is in an open configuration. Further, in the second mode of operation, the vacuum device generates a negative pressure which is applied to the exposed surface of the umbrella valve 60. The negative pressure generated will cause the peripheral portion of the flange 64 to separate from the secondary opening 58 just enough to allow air within the chamber 42 to be drawn there through. As soon as the vacuum pressure generated by the device 82 ceases, the peripheral portion of the flange 64 will bias back into its original position to seal the secondary opening 58. This bias may be the result of the resilient material, such as silicone for example, from which the umbrella valve 60 is formed. Alternatively, or in addition, the bias may also be the result of the negative pressure within the chamber 42. The vacuum sealing assembly 52 is typically in this second mode of operation after food has been disposed within the chamber 42 but prior to performing a food processing operation. In another embodiment, the vacuum sealing assembly 52 may be arranged in this second mode of operation to draw a vacuum within the chamber 42 after a food processing operation has been performed. Forming a vacuum after a blending operation may be used to increase the shelf life or storage of the food products within the attachment 30.

The vacuum sealing assembly 52 has a third configuration associated with a third mode of operation. In the third mode of operation, the peripheral portion of the flange 64 is lifted away from the secondary opening 58, absent a vacuum device 82, to allow air to flow into the chamber 42. To transform the vacuum sealing assembly 52 to the third configuration, a user may apply a rotational or upward force to the protrusion 68 to break the seal between the flange 64 of the umbrella valve 60 and the secondary opening 58. After a vacuum has been generated within the chamber 42 of the container 32, it is difficult, if not impossible to remove the blade assembly 34 and/or lid 43 to access the food product within the chamber 42 as a result of the forces acting thereon. Accordingly, a user should first break the vacuum within the container 32 by transforming the vacuum sealing assembly 52 into the third configuration prior to accessing the contents within the interior 42 of the container 32.

With reference now to FIGS. 7-11, another embodiment of a vacuum sealing assembly 52 is illustrated. In this embodiment, the mechanism 70 configured to restrict movement of the peripheral portion of the flange 64 of the umbrella valve 60 includes a connector or engagement member 84 pivotally mounted to the wall 54 of the container 32. As shown, a pivot axis is defined at a central portion of the engagement member 84 such that a first side 86 of the engagement member 84 extends from the axis in a first direction and a second side 88 of the engagement member 84 extends from the axis in a second, opposite direction. Further, a biasing mechanism 90 is coupled to and extends between a portion of the container 32 and the engagement member 84 at a position offset from the pivot axis. Due to the biasing force of the biasing mechanism 90, the engagement member 84 is biased into a position where the first side 86 of the engagement member 84 is in contact with the peripheral portion of the flange 64 to maintain the flange 64 in sealing engagement about the secondary opening 58. In addition, the engagement member 84 may include an opening 92 through which the protrusion 68 of the umbrella valve 60 extends. In the illustrated, non-limiting embodiment, the end 94 of the protrusion 68 has an increased diameter relative to the opening 92. As a result, when the engagement member 84 is rotated against the bias of the biasing mechanism 90, the engagement member 84 applies a force to the umbrella valve 60 via engagement with the distal end 94 of the protrusion 68.

Similar to the operation of the vacuum sealing assembly of FIGS. 5-6, the vacuum sealing assembly 52 of FIGS. 6-10, is operation in a plurality of modes, each having a distinct configuration. During a first, normal mode of operation (FIG. 6), the first side 86 of the engagement member 84 is biased into contact with the peripheral portion of the flange 64 to maintain the sealing engagement between the flange 64 and the secondary opening 58. In the second configuration, the vacuum pump 82 contacts the engagement member 84 such that the engagement member 84 is partially rotated against the biasing force of the biasing mechanism 90. As a result, positioning the vacuum pump 82 about the vacuum sealing assembly 52 causes the first side 86 of the engagement member 84 to move out of contact with the peripheral portion of the flange 64. In the illustrated, non-limiting embodiment, the engagement member 84 has a generally horizontal orientation when in the second configuration.

Figure 8:
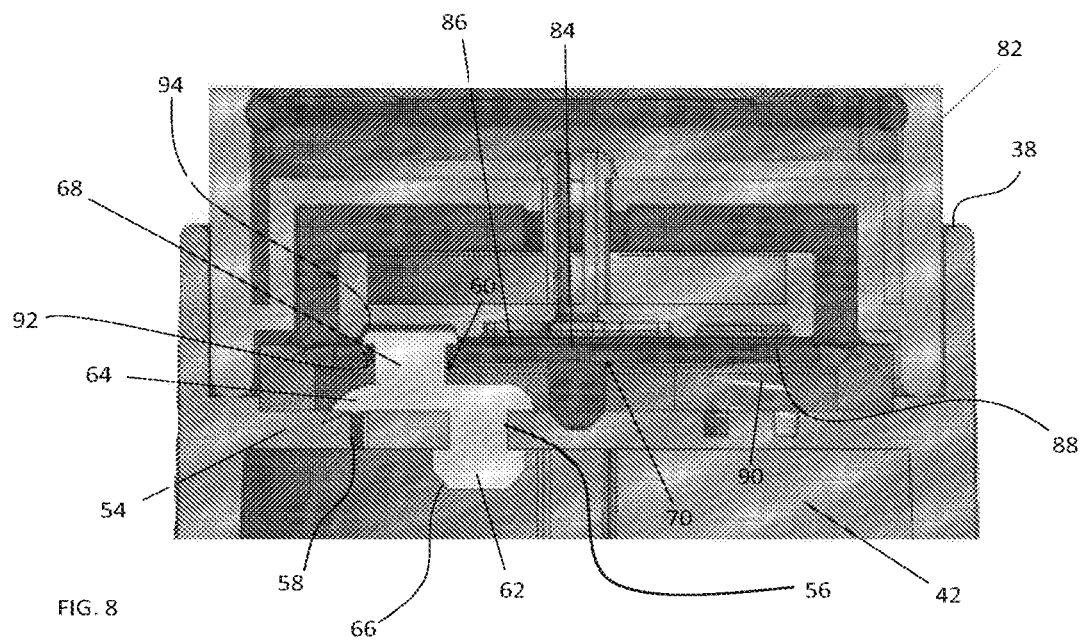
FIG. 8 is a cross-sectional view of the vacuum sealing assembly of FIG. 7 with a vacuum device applied thereto according to an embodiment.
Figure 9:
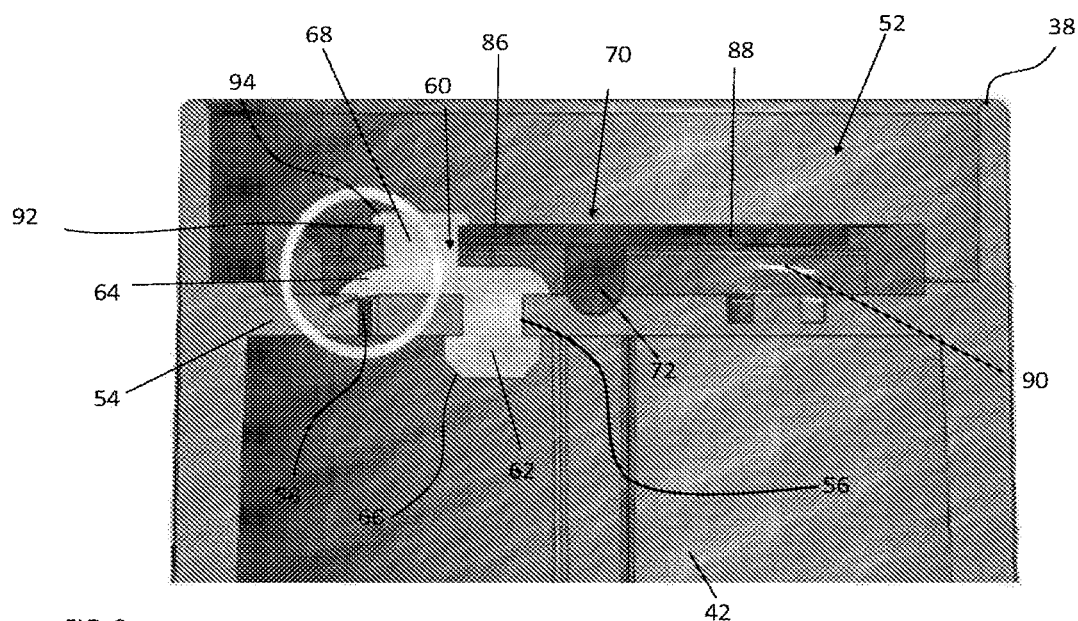
FIG. 9 is a cross-sectional view of the vacuum sealing assembly of FIG. 7 in a second configuration according to an embodiment.

In the second mode of operation, best shown in FIGS. 8 and 9, the vacuum device, illustrated at 82, is positioned about the vacuum sealing assembly 52. The negative pressure generated by the vacuum device 82 causes the peripheral portion of the flange 64 to separate from the wall 54 and therefore the secondary opening 58. The peripheral portion of the flange 64 will move only a minimal amount to allow air within the chamber 42 to be drawn into the vacuum device 82. When operation of the vacuum pump 82 stops, the resiliency of the valve 60 and the negative pressure within the chamber 42 will cause the peripheral portion of the flange 64 to reseal the secondary opening 58. Further, when the vacuum pump 82 is removed, the biasing force of the biasing mechanism 90 will bias the engagement member 84 back into the first configuration to restrict movement of the peripheral portion of the flange 64 relative to the secondary opening 58.

Figure 10:
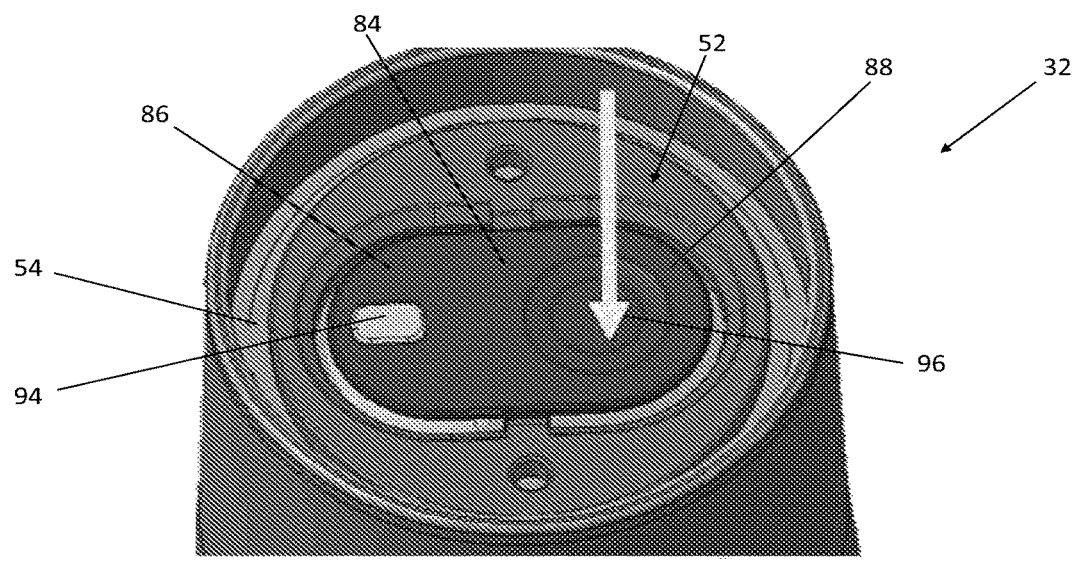
FIG. 10 is a top perspective of the vacuum sealing assembly of FIG. 7 in a third configuration according to an embodiment.
Figure 11:
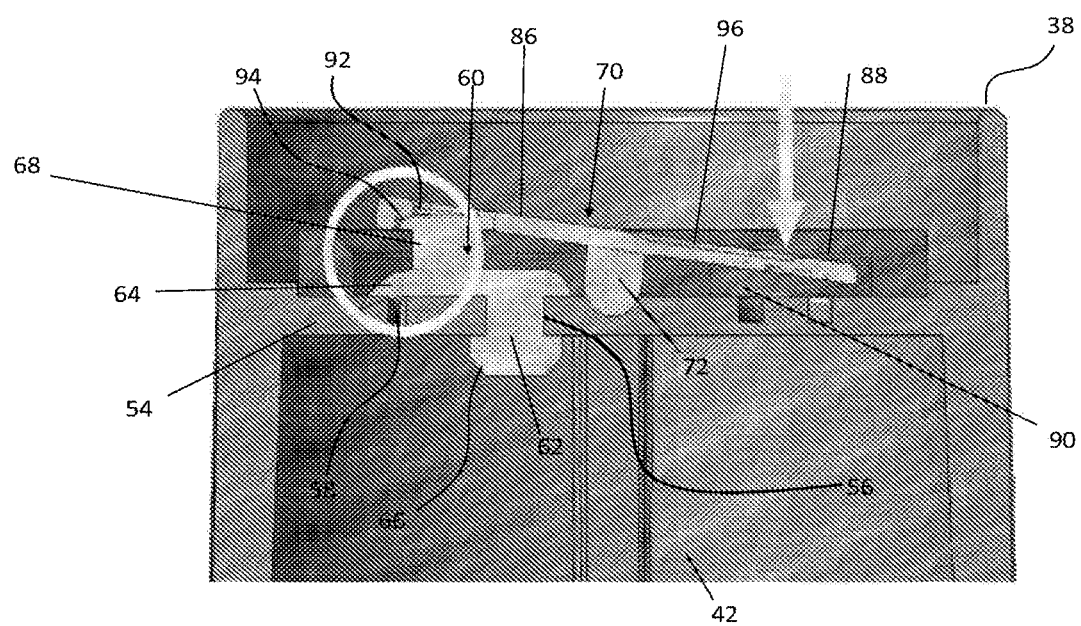
FIG. 11 is a cross-sectional view of the vacuum sealing assembly of FIG. 7 in a third configuration according to an embodiment.
Figure 12:
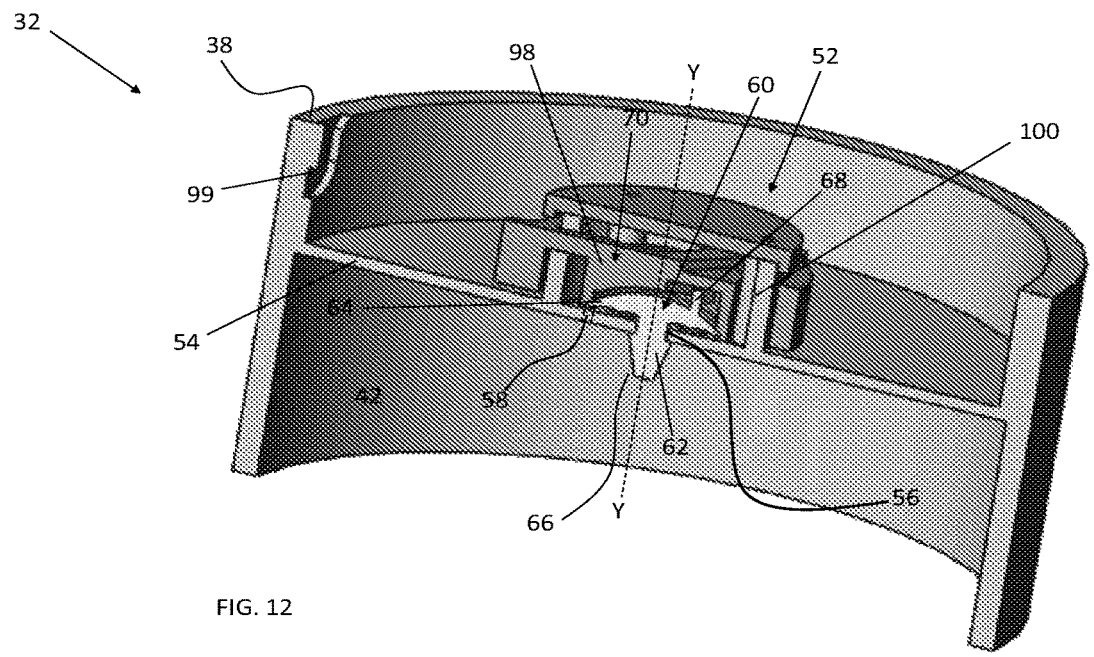
FIG. 12 is a perspective, cross-sectional view of another vacuum sealing assembly in a first configuration according to an embodiment.

In the third mode of operation, the engagement member 84 is arranged in a third configuration, as shown in FIGS. 10 and 11. In the third configuration, the engagement member 84 is rotated even further about the pivot axis in a direction opposite the biasing force of the biasing mechanism 90 such that the second side 88 of the engagement member 84 is located generally adjacent the wall 54 of the container 34. Through this rotation of the engagement member 84, the first side 86 of the engagement member 84 applies an upward force to the flange 64 of the umbrella valve 60 via engagement between the engagement member 84 and the end 94 of the protrusion 68. This rotation of the engagement member 84 causes the peripheral portion of the flange 64 to separate from the wall 54 of the container 32 and allow air to flow freely into the chamber 42. In the third mode of operation, a user applies a force to the second side 88 of the engagement member 84, opposite the biasing force of the biasing mechanism 90. In an embodiment, an indentation or other indicator 96 (see FIG. 10) may be formed on or in the engagement member 84 to identify to a user where to apply a force, i.e. press down, on the engagement member 84, to break the vacuum seal formed by the valve 60.

Figure 13:
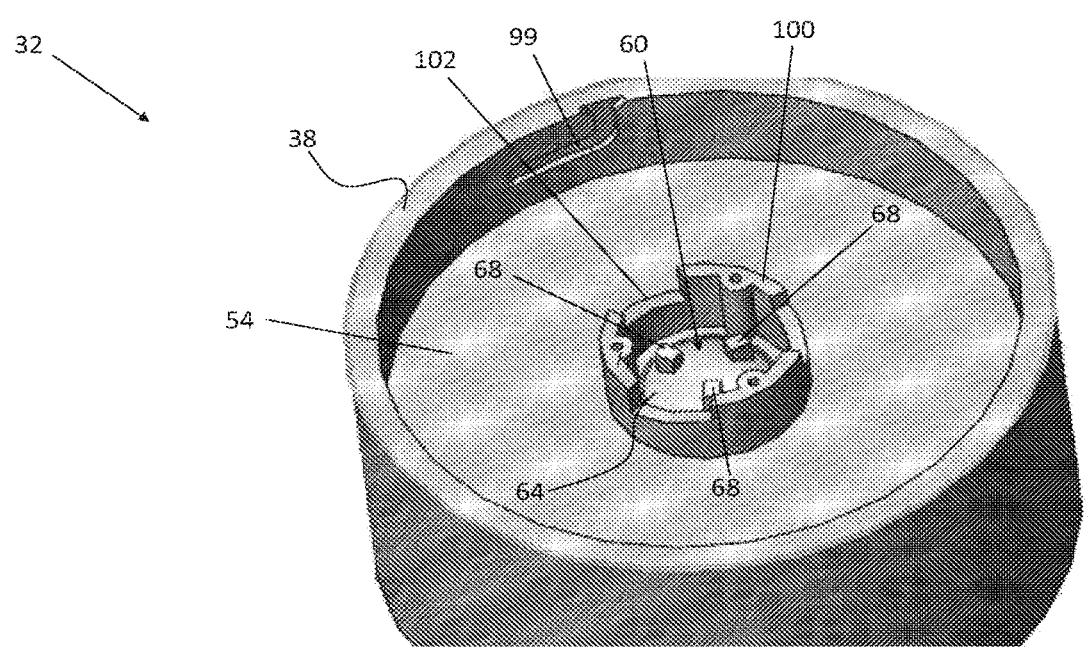
FIG. 13 is a top perspective view of a portion of the vacuum sealing assembly of FIG. 12 according to an embodiment.

In yet another embodiment, shown in FIGS. 12-15, the mechanism 70 configured to restrict movement of the peripheral portion of the flange 64 of the umbrella valve 60 includes an engagement member 98 rotatably mounted to one or more sidewalls 100 arranged adjacent the umbrella valve 60 and extending perpendicularly from the wall 54 (see FIG. 13). A portion of the engagement member 98 is received within a track 102 formed in the one or more sidewalls 100 such that as the engagement member 98 is rotated about an axis Y in a first direction, the engagement member 98 will travel along the path defined by the track 102. The contour of the track 102 is designed to facilitate vertical movement of the engagement member 98 relative to the umbrella valve 60. In an embodiment, the mechanism 70 additionally includes a biasing member (not shown), such as a torsion spring for example, coupled to the engagement member 98. The biasing force of the biasing member opposes rotation of the engagement member 98 in a first direction, and therefore movement of the engagement member 98 out of contact with the umbrella valve 60.

In addition, the engagement member 98 may be coupled to the protrusion 68 of the umbrella valve 60. In the illustrated, non-limiting embodiment, the protrusion 68 includes a plurality of protrusions 68 (see FIG. 13). However, it should be understood that embodiments including only a single protrusion 68 are also within the scope of the disclosure. When the engagement member 98 is rotated in the first direction about axis Y against the bias of the biasing mechanism, the engagement member 98 applies an upward force to the umbrella valve 60 via engagement with the one or more protrusions 68 to break the seal between the peripheral portion of the flange 64 and the at least one secondary opening 58.

Figure 14:
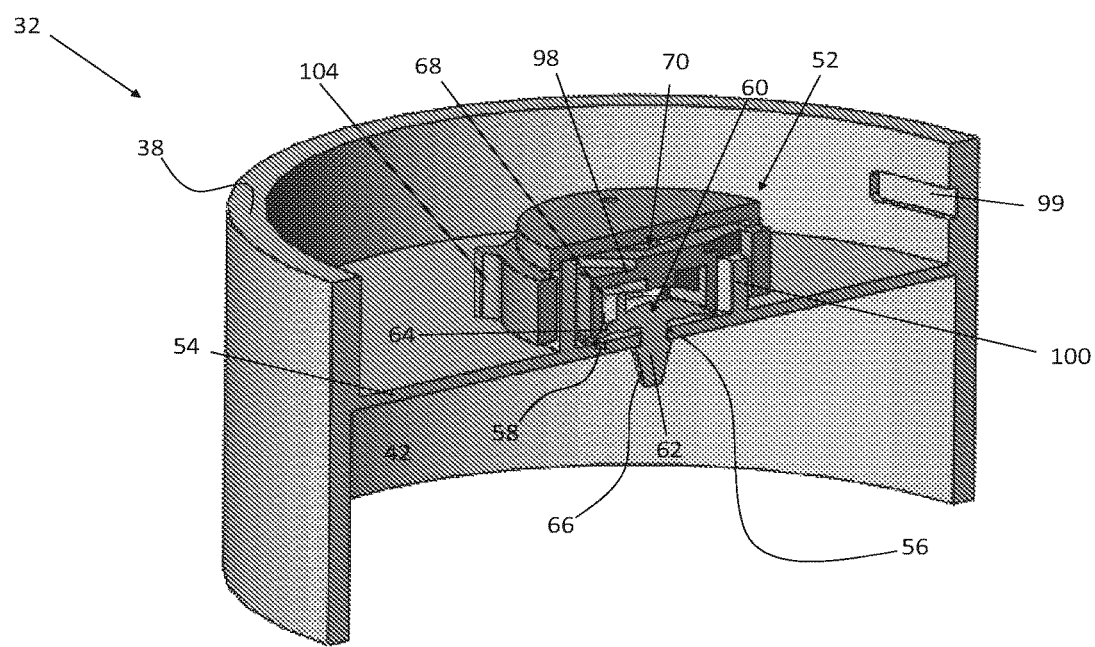
FIG. 14 is a perspective, cross-sectional view of the vacuum sealing assembly of FIG. 12 in a second configuration according to an embodiment.

The vacuum sealing assembly of FIGS. 12-16, is operable in a first, normal or default mode (FIG. 11), when the vacuum sealing assembly 52 is in a first configuration. In the first configuration, the engagement member 98 is biased downwardly and into contact with the peripheral portion of the flange 64 to maintain the sealing engagement between the flange 64 and the at least one secondary opening 58. A top view of the engagement member 98 in the first configuration is illustrated in FIG. 16A. With reference to FIGS. 14 and 16B, in the second configuration, the engagement member 98 is partially rotated against the biasing force of the biasing mechanism, in a direction indicated by arrow A, such that the engagement member 98 is minimally offset from the peripheral portion of the flange 64 of the umbrella valve 60. In the second mode of operation, a vacuum device 82 is positioned about the vacuum sealing assembly 52. In an embodiment, installation of the vacuum device 82 about the vacuum sealing assembly 52 rotates the engagement member 98 against the bias of the biasing mechanism. As shown in the FIGS., one or more grooves 99 may be formed the sidewall surrounding the vacuum sealing assembly 52. The vacuum pump 82 may include corresponding tabs or protrusions (not shown) that are receivable within these grooves 99. Accordingly, the configuration of each groove 99 not only retains the vacuum pump 82 in position relative to the vacuum sealing assembly 52, but also defines a maximum amount of rotation of the vacuum pump 82 that may be transmitted to the engagement member 98. In an embodiment, the grooves 99 are designed to restrict rotation of the vacuum pump 82, and therefore the engagement member, beyond the second configuration.

The negative pressure generated during operation of the vacuum device 82 causes the peripheral portion of the flange 64 to separate from the wall 54 and therefore the secondary opening 58. The peripheral portion of the flange 64 will move to allow air from within the chamber 42 to be drawn into the vacuum device 82. When the negative pressure is eliminated, the biasing force of the biasing mechanism will bias the engagement member 98 back into the first configuration to seal the secondary opening 58.

Figure 15:
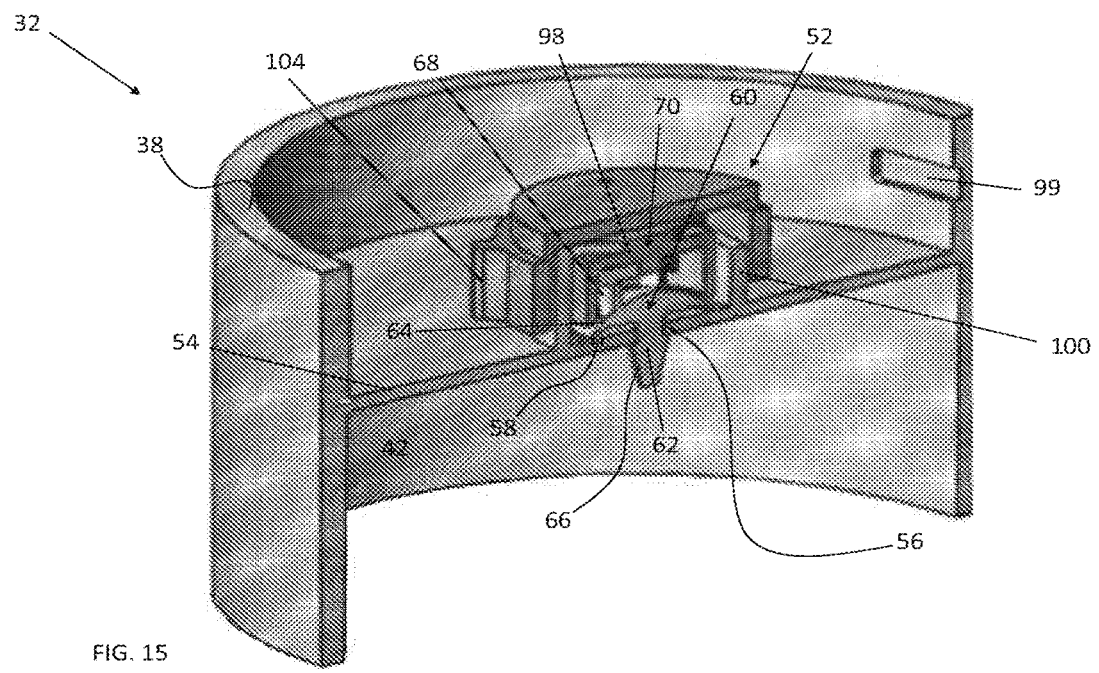
FIG. 15 is a perspective, cross-sectional view of the vacuum sealing assembly of FIG. 12 in a third configuration according to an embodiment.
Figure 16C:
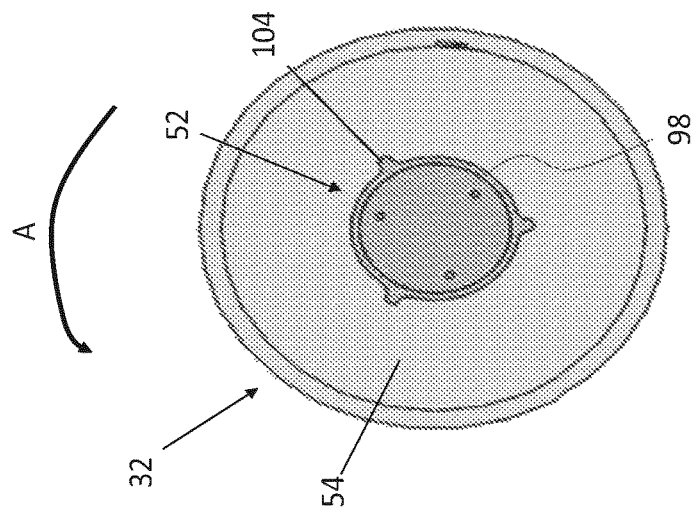
FIGS. 16A-16C are top views of the vacuum sealing assembly of FIG. 12 according to an embodiment.
Figure 16B:
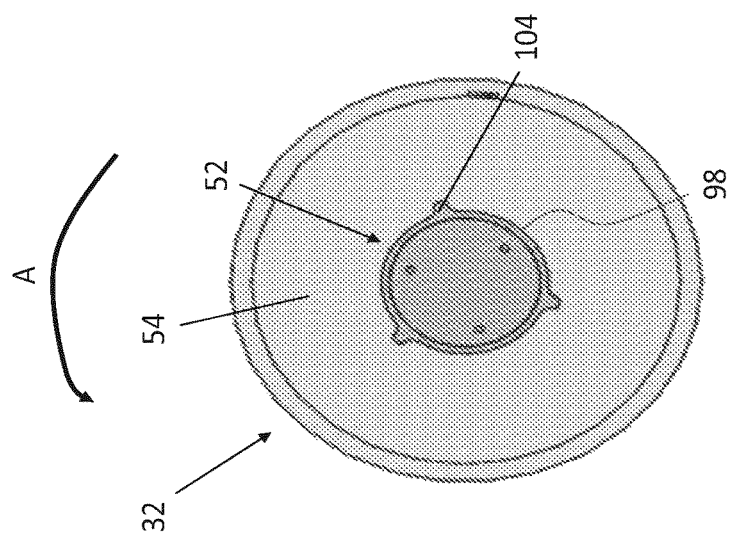
Figure 16A:
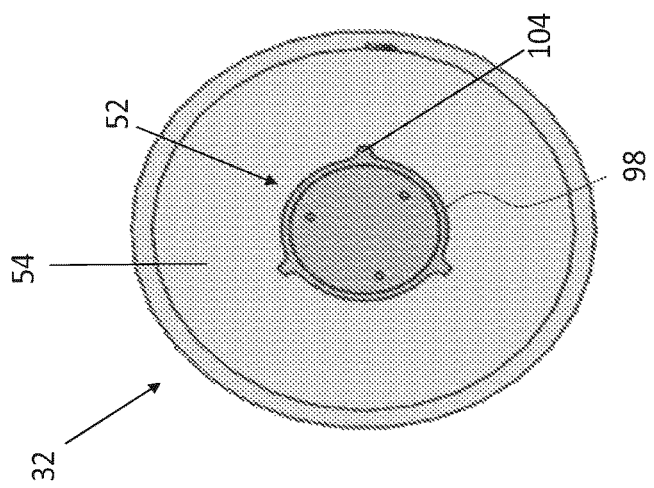

In the third mode of operation, the engagement member 98 is arranged in a third configuration, as shown in FIGS. 15 and 16C. In the third configuration, the engagement member 98 is rotated further about the axis Y in a first direction indicated by arrow A, causing the engagement member 98 to move vertically upwardly within the track 102. Through this rotation of the engagement member 98 and the corresponding vertical movement, the engagement member 98 applies an upward force to the one or more protrusions 68 of the umbrella valve 60, thereby causing the peripheral portion of the flange 64 to separate from the wall 54 of the container 32 and allow air to flow freely into the chamber 42. The third mode of operation is typically initiated by a user, by applying a rotational force to the exterior of the engagement member 98 to oppose the biasing force of the biasing mechanism. In an embodiment, one or more tabs 104 extends from an exterior surface of the engagement member 98 to facilitate rotation of the engagement member 98 by a user.

Figure 17A:
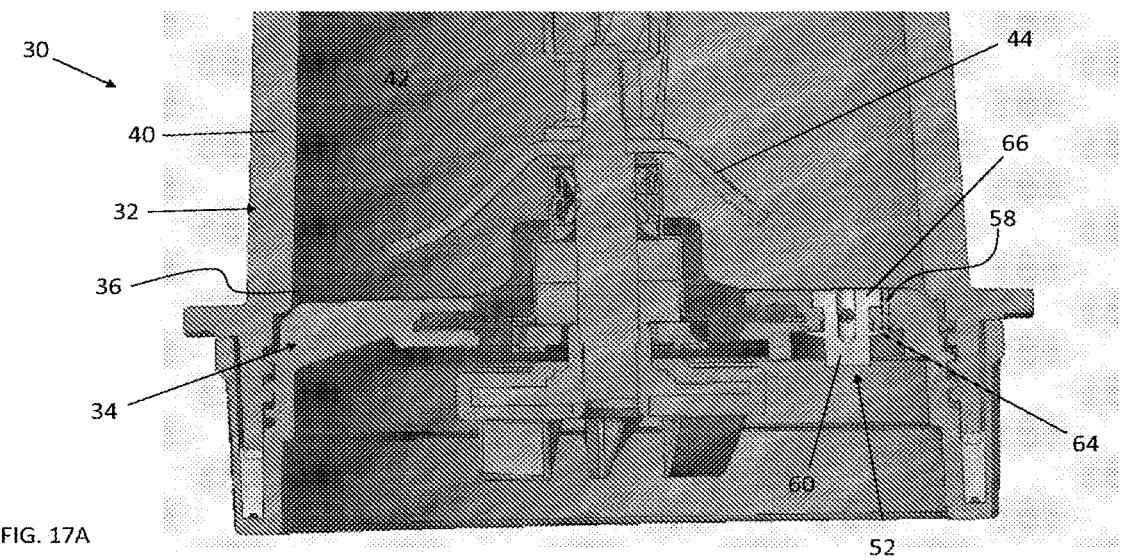
FIGS. 17A and 17B are cross-sectional view of a vacuum sealing assembly located within a rotatable blade assembly according to an embodiment.
Figure 17B:
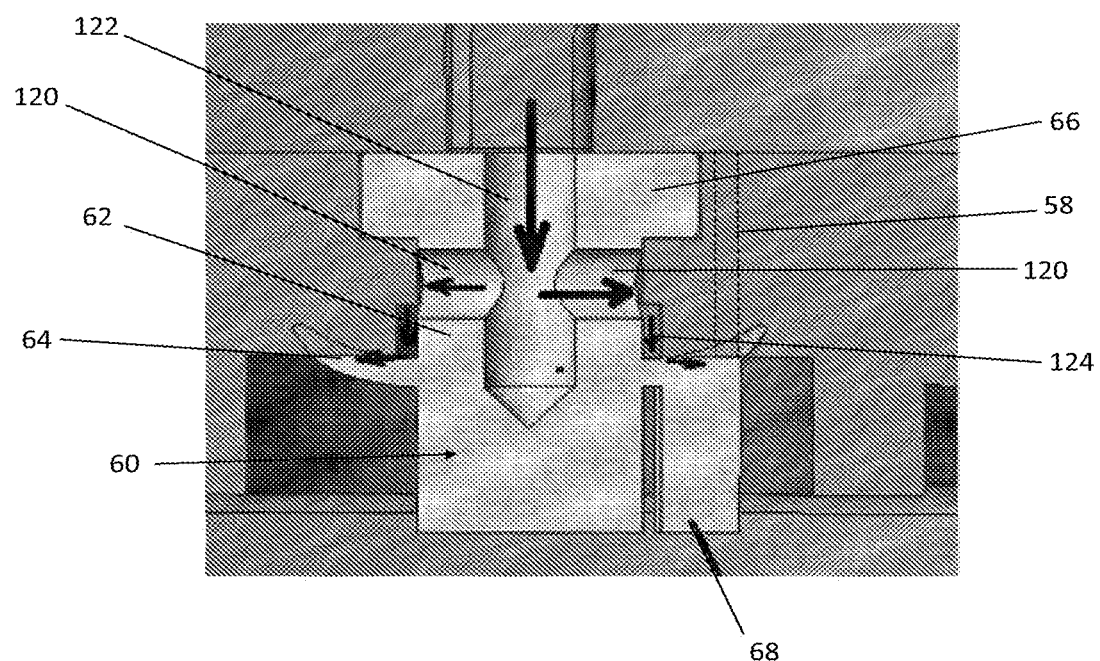

With reference now to FIGS. 17A and 17B, an example of another vacuum sealing assembly 52 of an attachment 30 of the food processing system 20 is illustrated. In the illustrated, non-limiting embodiment, the vacuum sealing assembly 52 is illustrated as being formed in the rotatable blade assembly 34 coupled to an inverted container 32. However, it should be understood that the vacuum sealing assembly 52 may additionally or alternatively be located at a lid 43 or container 32 of the attachment 30. Similar to the previous embodiments, the sealing assembly 52 includes an umbrella valve 60 having a valve stem 62 extending through the primary opening and a flange 64 extending generally perpendicular to the valve stem 62. The flange 64 is sized such that a portion of the flange 64, such as near the periphery of the flange 64 for example, is in overlapping arrangement with the at least one secondary opening 58. The umbrella valve 60 additionally includes at least one protrusion 68 extending from the flange 64, in a direction generally opposite the valve stem 62.

Under normal conditions, the flange 64 seals the at least one secondary opening 58 to prevent a flow of fluid and/or food particles there through. Further, by positioning the vacuum sealing assembly in the rotatable blade assembly 34 or lid 43 of the attachment 30, the contents of the chamber 42 are typically not in contact with the valve 60 when the attachment 30 is not coupled to the base 22. This reduces the risk of ingredients leaking through seal formed by the valve. However, it should be understood that the vacuum sealing assembly 52 of FIGS. 17A and 17B may be adapted to include an engagement mechanism, such as described with respect to the other embodiments for example, to apply a force to the periphery of the flange 64 to restrict movement of the flange 64 out of sealing engagement with the secondary opening 58.

Figure 18:
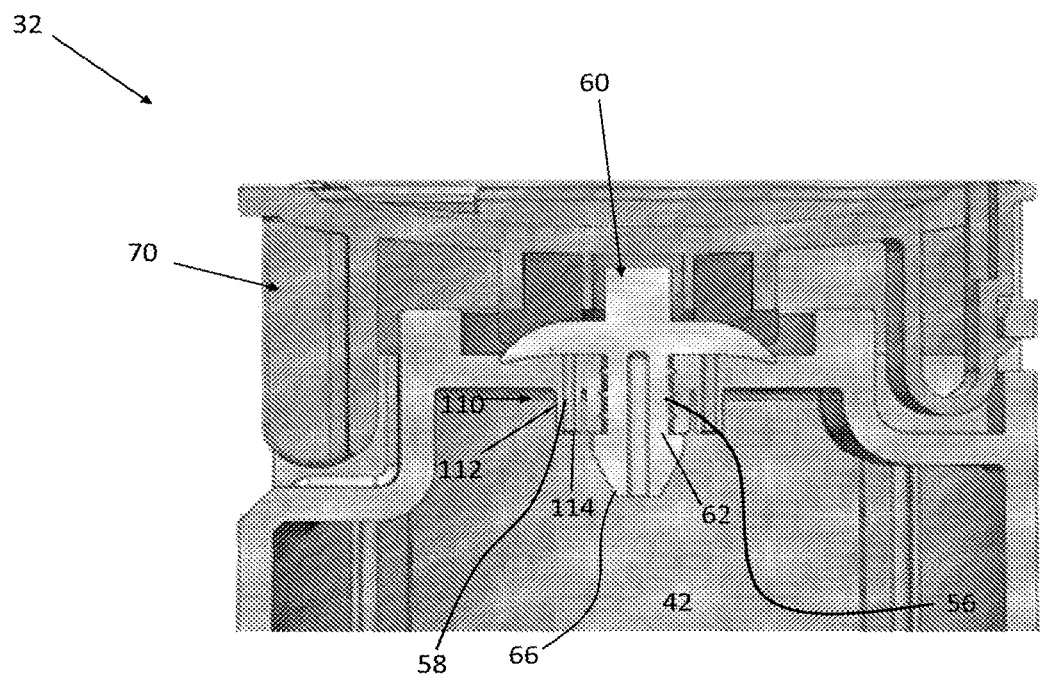
FIG. 18 is a cross-sectional view of a vacuum sealing assembly according to another embodiment.
Figure 19:
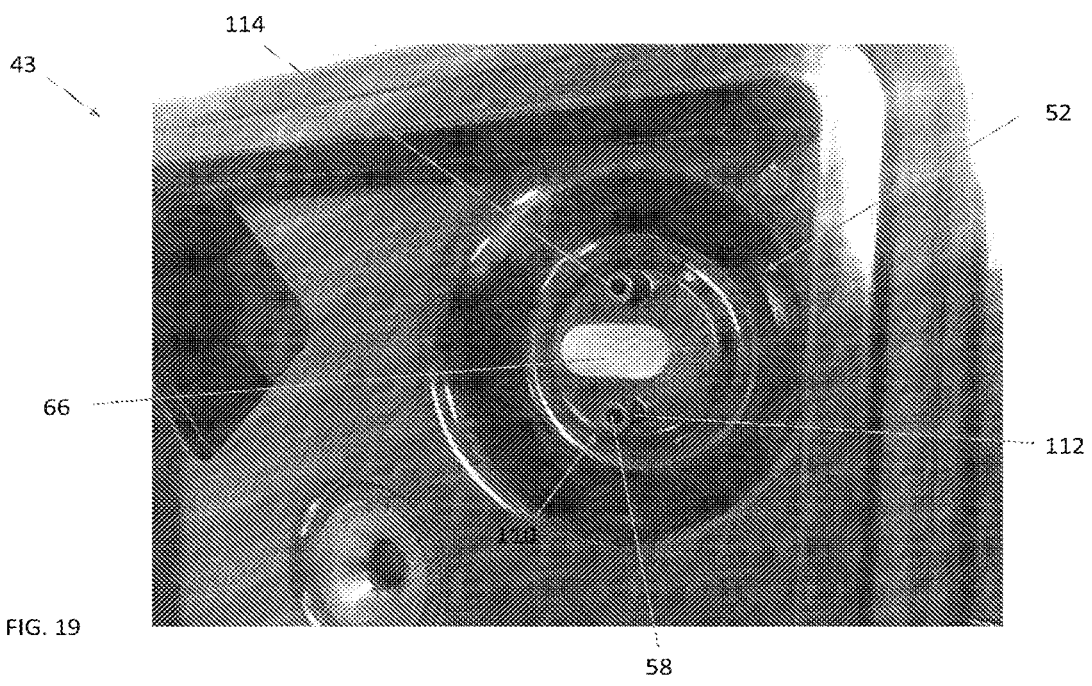
FIG. 19 is a perspective view of a vacuum sealing assembly including a snorkel formed in a lid according to an embodiment.

With reference to FIGS. 18 and 19, the container 32 may additionally include one or more snorkels 110 to prevent liquid from being evacuated from the chamber 42 during a vacuuming operation. In the illustrated, non-limiting embodiment, each snorkel 110 is formed surrounding one or more secondary opening 58. As shown, each snorkel 110 includes a protrusion 112, such as formed via extrusion for example, that extends into the chamber 42. A distal end 114 of the snorkel 110 is offset from an adjacent portion of the wall, for example wall 54, through which the secondary opening 58 extends. Inclusion of the snorkel 110 prevents residual liquid from exiting the secondary openings 58 during a vacuuming operation. Because the fluid arranged in contact with the distal end 114 of the snorkel 110 will be drawn into the secondary opening 58 during a vacuum operation due to surface tension, an overall surface area of distal end 114 of each snorkel 110 is minimized to reduce the amount of ingredients that are evacuated. By locating the distal end 114 of the snorkel 110 offset from the surface of the wall 54, the liquid arranged in contact with the wall 54 is prevented from being drawn into the secondary opening 58.

With reference again to FIG. 17B, in some embodiments, the umbrella valve 60 may optionally include one or more first channels 120 extending generally parallel to the flange 64. The first channels 120 may be in communication with a second channel 122, such as a vertically oriented channel formed in the valve stem 62, and also with a small clearance 124 formed in the wall adjacent the umbrella valve 60. From the first channels 120, liquid may be communicated to the clearance 124 and to an underside of the flange 64 umbrella valve 60. The first and/or second channels 120, 122 illustrated and described herein may be used in place of or in addition to the snorkel 110 as shown in FIGS. 18 and 19 to prevent excess fluid from within the chamber 42 from being drawn through the secondary opening 58 during a vacuum operation.

A container 32 having a vacuum sealing assembly 52 as illustrated and described herein when used in conjunction with a vacuum device prior to a food processing operation may provide a food product having increased vitamin retention, specifically vitamin C. Exposure to oxygen within during the blending process may cause the ingredients within the container to degrade. By removing the oxygen from the container, the overall degradation of the nutritional properties of the ingredients being processes is reduced.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A container assembly comprising:
a sealable body including a chamber;
at least one opening formed in said sealable body; and
a vacuum sealing assembly mounted to said sealable body adjacent said at least one opening, said vacuum sealing assembly including:
a valve; and
a mechanism moveable between a first position that maintains said valve in a sealing engagement with said at least one opening, and a second position that in which said valve is openable by a negative pressure to allow air to be drawn out of the chamber;
wherein the mechanism is moveable from the first position to the second position by application of a vacuum device to the vacuum sealing assembly; and
wherein the first position defines a first mode of operation, and the second position defines a second mode of operation.

2. The container assembly of claim 1, further comprising a biasing mechanism coupled to said mechanism, wherein said mechanism is biased into said first position by a biasing force of said biasing mechanism.

3. The container assembly of claim 1, wherein said sealable body further comprises:
a container defining the chamber and having an open end; and
a rotatable blade assembly coupled to the open end of the container.

4. The container assembly of claim 1, wherein the sealable body further comprises:
the container defining a chamber;
at least one rotatable blade disposed within said chamber; and
a lid coupled to an open end of the container.

5. The container assembly of claim 1, wherein said valve includes a valve stem and a flange in overlapping arrangement with said at least one opening.

6. The container assembly of claim 5, wherein in said first position, said mechanism applies a force to a peripheral portion of said flange.

7. The container assembly of claim 5, wherein a portion of said mechanism engages said flange.

8. The container assembly of claim 5, wherein said valve further comprises at least one protrusion extending from said flange.

9. The container assembly of claim 8, wherein said mechanism is coupled to said at least one protrusion.

10. A food processing system comprising:
a food processor base including a rotary component;
a vacuum device for generating a negative pressure; and
an attachment configured for removable association with said food processor base, said attachment including:
a sealable body including a chamber and at least one opening;
a rotary coupling connected to at least one blade positioned within said chamber of said sealable body, and said rotary coupling being associable with said rotary component of said food processor base; and
a vacuum sealing assembly mounted to said sealable body and said at least one opening, said vacuum sealing assembly including a valve;
wherein said valve includes a valve stem and a flange, said flange being positioned in overlapping arrangement with said at least one opening;
wherein the vacuum sealing assembly includes a mechanism movable between a first configuration of the vacuum sealing assembly defining a first mode of operation, and a second configuration of the vacuum sealing assembly defining a second mode of operation;
wherein, in the first configuration, the mechanism is configured to maintain said valve in sealing engagement with said at least one opening;
wherein, in the second configuration, the valve is openable by said negative pressure to allow air to be drawn out of the chamber; and,
wherein the mechanism selectively applies a force to a peripheral portion of said flange to maintain said valve in sealing engagement with said at least one opening.

11. The food processing system according to claim 10, wherein said mechanism further comprises:
an engagement member rotatable about an axis relative to said valve; and
a biasing mechanism coupled to said engagement member, wherein said engagement member is biased into contact with said valve by a biasing force of said biasing mechanism.

12. The food processing system according to claim 10, wherein said sealable body further comprises:
a container including an open end; and
a lid mounted to said open end of said container.

13. The food processing system according to claim 12, wherein said vacuum sealing assembly is formed in said lid.

14. The food processing system according to claim 10, wherein said sealable body further comprises:
a container including an open end; and
a rotatable blade assembly including said rotary coupling connected to at least one blade, said rotatable blade assembly being mounted to said open end of said container.

15. The food processing system according to claim 14, wherein said vacuum sealing assembly is formed in said container.

16. The food processing system according to claim 14, wherein said vacuum sealing assembly is formed in said rotatable blade assembly.

17. A method of blending one or more food items, comprising:
providing a food processing system having a food processing attachment;
arranging the one or more food items within a chamber of food processing attachment;
moving an engagement mechanism of a vacuum sealing assembly of said food processing attachment from a first position defining a first configuration wherein the engagement mechanism is configured to maintain a valve in sealing engagement with at least one opening in the food processing attachment, to a second position defining a second configuration, wherein the valve is openable by a negative pressure to allow air to be drawn out of the chamber;
applying a vacuum device to the vacuum sealing assembly to generate a vacuum within said chamber;
performing a food processing operation;
removing said vacuum device; and
wherein applying said vacuum device to said vacuum sealing assembly moves said engagement mechanism from said first position to said second position.

18. The method of claim 17, wherein applying said vacuum device to said vacuum sealing assembly opposes a biasing force of a biasing mechanism coupled to said engagement mechanism.

19. The method of claim 17, wherein moving said engagement mechanism from said first position to said second position includes rotating said engagement mechanism about an axis in a first direction.

* * * * *